July 25, 1933.   G. PATART   1,919,253
METHOD FOR DESTRUCTIVELY DISTILLING CARBONACEOUS FUELS
Filed March 8, 1926
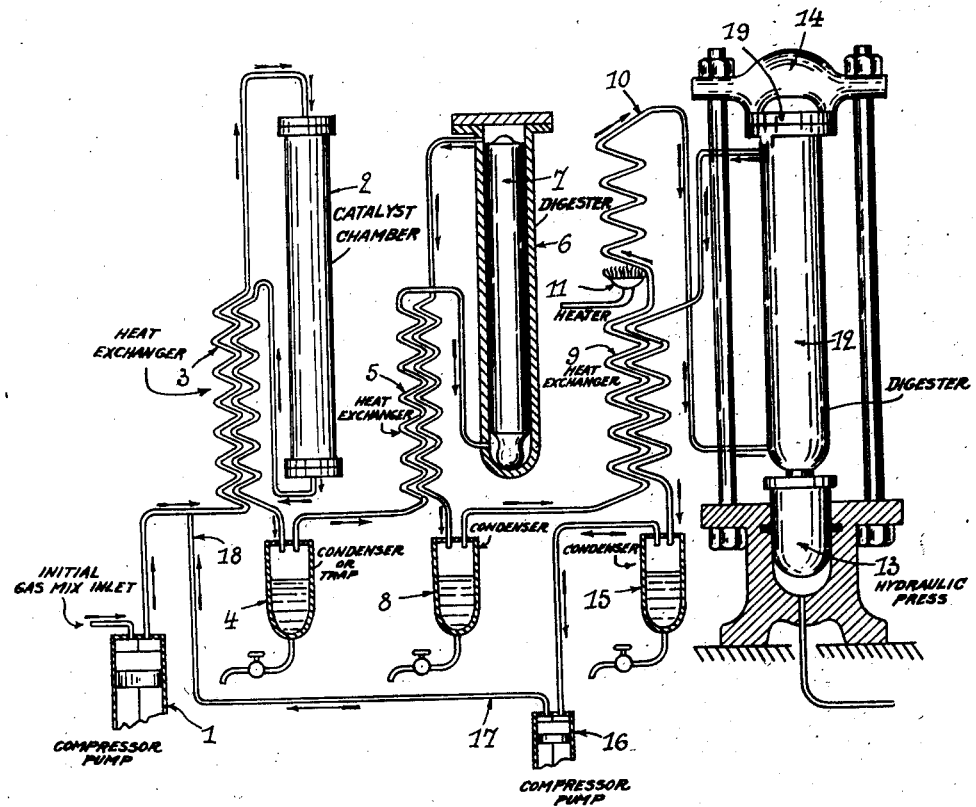

Patented July 25, 1933

1,919,253

UNITED STATES PATENT OFFICE

GEORGES PATART, OF PARIS, FRANCE

METHOD FOR DESTRUCTIVELY DISTILLING CARBONACEOUS FUELS

Application filed March 8, 1926, Serial No. 93,316, and in France March 21, 1925.

This invention relates to methods for obtaining valuable compounds from organic substances, such as fuels, by the utilization of gases and vapors at high temperatures and under high pressures, said gases and vapors being obtained from an intermediate step in catalytic processes for synthesizing various compounds of carbon with hydrogen and oxygen carried out at high temperatures and under high pressures.

These processes include the exothermic syntheses by which hydrocarbons, alcohols, aldehydes, ketones and the like are obtained by the combined action of heat, pressure and catalyzers upon gas mixtures consisting of oxides of carbon, hydrogen, with or without hydrocarbons rich in hydrogen. In carrying out these operations the gas mixture containing the products of reaction, whose composition has just been indicated, is discharged from the reaction chamber at temperatures of about 200–600° C. and is generally maintained in circulation at very high pressures, that is, in the range of 200 atmospheres or more. As generally carried out, this gas mixture from the reaction chamber is cooled and condensable products thereby removed, the uncondensed gases being recirculated as described, being reheated in any suitable manner. It will be seen, therefore, that the heat energy contained in the gas mixture coming from the reaction chamber is entirely dissipated in the condenser and generally serves no useful purpose.

It is also well known that it is possible to obtain valuable products by the destructive distillation of fuels such as coal, lignite, peat, wood, mineral oils or petroleums, shale oil, vegetable or animal oils, or the residues from certain manufacturing operations such as tars, cracking residues, naphthalenes, pitches, resins and the like. The methods usually employed contemplate the treatment of such fuels by a simple pyrogenic decomposition or by distillation under pressure, with or without the use of a current of hot gas. However, it has been found in the past that these suggested methods could not be utilized to a commercial degree because of the high cost of compressing the gases in use or of the other details of operation.

It is an object to carry out the distillation or decomposition of these fuels in an economical and commercial manner utilizing certain products found in an intermediate step of a large class of chemical manufacturing operations in which large quantities of gases and vapors are produced under a high degree of compression, the said gases being at a high temperature and consequently carrying a large amount of energy available as heat, which heat is unnecessary from the standpoint of the main process. Other objects will be apparent from the specification.

The above objects are attained by the present invention which comprises treating fuels with these gases and vapors containing waste heat and being under high pressures, to obtain from these fuels valuable gases and vapors.

The accompanying drawing illustrates diagrammatically an assemblage of apparatus in which the processes to be described may be carried out.

In this drawing, 1 indicates a suitable compressor pump by means of which the original gas mixture to be subjected to the synthesizing reaction is compressed and forced into the catalyzing tube or chamber 2. This initial gas mixture is heated to the proper temperature by any suitable means, additional heat being supplied, if desired, by means of heat interchanger 3, in which the hot gases discharging from the catalyst chamber give up a portion of their heat to the incoming gas mixture. The hot gases from the catalyst chamber pass through condenser or trap 4 which is operated in such a manner that but little heat is extracted from the gases or vapors passing through the same. Under the extremely high pressures existing in the apparatus only slight reductions in temperature may result in the condensation of considerable portions of condensable liquid. If desired, this condenser 4 may be operated merely as a trap and by-pass to heat interchanger 5 and thence to the bottom of digester 6 in which is disposed receptacle 7 containing the organic substance to be treated. Gases flow out of digester 7, preferably at the top, passing through heat interchanger 5 and thence to condenser 8 wherein are collected the condensable substances in the gas mixture. If desired, the uncondensed gases trapped off from condenser 8 may be passed back in any suitable manner to the catalyst chamber 2. However, as shown in the drawing, condenser 8 acts merely as a partial condenser and the still hot gases passing off of condenser 8 then pass through heat interchanger 9 and heating coil 10 heated by heater 11 to the bottom of a second digester 12 which is kept tightly closed by means of a hydraulic press comprising hydraulic piston 13 and press head 14 operating from a suitable source of fluid pressure (not shown) to maintain cover 19 in tightly closed relation with digester 12. Gases coming from the top of digester 12 pass through heat interchanger 9 and thence to final condenser 15 in which condensation takes place with the removal of the condensable products of the reactions and distillations, the uncondensed gases from said condenser 15 being withdrawn by circulating and compressing pump 16 and by line 17 to be recirculated with the gas from pump 1 to and through the catalyst chamber 2 as already described.

For the better understanding of the characteristic features of my invention, the following examples are given of the method of carrying out the same; but these examples are given merely by way of illustration and are not to be considered as limiting the scope of the invention.

*Example 1.*—The main synthetic reaction, the waste heat of which is to be utilized, is carried out by passing a gas mixture containing hydrogen, carbon monoxide and ethylene or other unsaturated hydrocarbons over a suitable catalyst in the catalysis chamber 2 which is maintained at a temperature of about 450° C. As examples of such catalysts may be mentioned nickel, silver and copper all of which are known to be catalysts of hydrogenations or oxidations. The entire system is maintained at a pressure of about 250 atmospheres. In normal operation, the products of the reaction will consist of hydrocarbons and oxygenated derivatives of hydrocarbons, and these productes mixed with the gases which did not take part in the reactions in the catalysis chamber are passed to the condensers where condensable substances are liquefied and separated from the remaining gases which are again circulated over the catalyst, with or without the addition of other gases.

The present invention is applied by placing between the catalysis chamber 2 and the final condenser 15 any suitable type of digesters 6 and 12 containing coking coal having about 22% of volatile substances. The gases coming from the catalysis chamber 2 are at a temperature of about 420–450° C. and at 250 atmospheres pressure. These gases pass through the digesters 6 and 12, preferably in an upward direction and thence by suitable conduit or like means to the condenser 15 where are collected the condensable products of the reactions which take place in the catalysis chamber 2, as well as liquefiable products obtained by the distillation of the coal. After about three hours' treatment, the coal is found to have been coked to a porous form with a brilliant black appearance, while the condensate is found to contain an increased amount of volatile organic substances of a hydrocarbon nature having high calorific value, as well as ammonia and clear tars. The gases passing from the condenser 15 will have been enriched in methane and the olefines. The amount of volatile substances obtained from the coal may be much increased by raising the temperature of the gas from the catalysis chamber to 750–800° C., as by means of heater 10 and burner 11, before these gases enter the digester 12 and by heat interchanger 9, this additional heat may be imparted to some extent to the gases which enter the digester. The coke which is collected as a residue in the digester may be used for any desired purpose and it is particularly economical to use it to produce the initial gas mixture for the main catalytic reaction.

*Example 2.*—The main synthetic reaction is carried out generally as described in Example 1 except that the conditions are regulated to synthesize methanol by passing a gas mixture containing approximately one volume of carbon monoxide, two volumes of hydrogen and variable amounts of methane and nitrogen over a suitable methanol catalyst, for example, any of those mentioned in Example 1, in reaction chamber 2 maintained at a temperature of 300° C., the reaction system being under a pressure of about 300 atmospheres. Under normal operation the methanol and other condensable products formed in the reaction chamber are condensed out and the remaining gases recirculated in the usual manner. Applying the present invention, the digesters 6 and 12 are interposed between the reaction chamber 2 and the condenser 15, said digesters containing broken fragments of pine wood. The gaseous substances coming from the reaction chamber pass through the digesters, contacting with the wood contained therein and thence from the digesters to the condenser 15. The hot gases from the reaction chamber preferably pass through the digesters in an upward direction. If desired, a portion of the condensate may be circulated through one or both of the digesters by any suitable means (not shown) and preferably in a downward direction. This extraction with the liquid in addition to distillation effected by the hot gases results in a more complete and more rapid recovery of the desirable values from the wood. The liquid discharged from the bottom of the digesters contains, in addition to the undecomposed methanol originally present, pine oil, acetone, isopropyl alcohol and acetic acid, all of which have been extracted from the wood, while the gases coming from the digesters are enriched in hydrogen, carbon monoxide and methane together with an appreciable amount of ethylene and its homologues, which latter may subsequently take part in the reactions of the catalyst chamber, with the resultant formation of liquid hydrocarbons as described in the main synthetic reaction of Example 1. The residue in the digesters consists primarily of a high grade of charcoal which may be used for the production of the original gas mixture or for other suitable uses.

*Example 3*.—The main synthetic reaction is much similar to that of Example 1, employing a gas mixture consisting of one volume of ethylene, one volume of carbon monoxide and two volumes of hydrogen, the pressure being 850 atmospheres and the reaction chamber being maintained at a temperature of about 300° C. The catalyst for the reaction may be a combination of the oxides of zinc and chromium formed by the reduction of basic zinc chromate. The digesters 6 and 12 may contain heavy petroleum oil, naphthalene, or the residues from the distillation of vegetable or mineral oils, and the gases from the reaction chamber are caused to bubble through the same before they enter the condenser 15. If desired, the oils, etc., may be raised to a temperature of 430–450° C. This treatment produces a large quantity of light oils in the condensate and the gases trapped off of the condenser 15 and returned to the initial gas mixture are greatly enriched in the olefinic hydrocarbons.

The method of carrying out the present invention is susceptible of many variations without departing from the spirit or scope thereof. The condensate collected in condenser 15 may be fractionated if desired, or treated in any other suitable manner. If desired, certain special catalyzers may be incorporated into the solid fuels under treatment or may be immersed in the liquid fuels which are treated as described. These catalysts may be of any suitable nature to promote the decomposition of the fuels and promote the reactions taking place in digesters 6 and 12.

Any suitable variations may be introduced into the processes without departing from the spirit and scope thereof, except as defined in the appended claims.

I claim:

1. In the process of destructively distilling material taken from the class consisting of normally solid and liquid carbonaceous materials which yield substantial amounts of volatile products upon distillation, the steps which comprise carrying out an exothermic hydrogenation of a carbon compound under an elevated temperature and pressure sufficient to cause said reaction to take place, said reaction being of a character which will produce, under reaction conditions, a gaseous mixture containing reaction products and unreacted gases, withdrawing the hot compressd gaseous mixture, and contacting said hot compressed gaseous mixture with a body of said carbonaceous material to be destructively distilled whereby to impart to said material the heat and pressure requisite for effecting any destructive distillation thereof, said carbonaceous material being obtained from a source independent of said reaction.

2. In the process of destructively distilling material taken from the class consisting of normally solid and liquid carbonaceous materials which yield substantial amounts of volatile products upon distillation, the steps which comprise carrying out the catalytic synthesis of methanol by reacting a carbonic oxide and hydrogen in the presence of a hydrogenating catalyst and under an elevated temperature and pressure sufficient to effect the said synthesis, withdrawing the hot compressed gaseous mixture containing methanol vapor and unreacted gases, and contacting said hot compressed gaseous mixture with a body of said carbonaceous material to be destructively distilled, said carbonaceous material being obtained from a source independent of the methanol forming synthesis.

3. In the process of concurrently carrying out the destructive distillation of material taken from the class consisting of normally solid and liquid carbonaceous materials which yield substantial amounts of volatile products upon distillation to form gaseous and liquid products, and the catalytic formation of methanol, the steps which comprise continuously introducing into a reaction zone a mixture containing a carbonic oxide and hydrogen, reacting the said mixture under an elevated temperature and pressure sufficient to effect the formation of methanol, continuously withdrawing from the reaction zone the hot compressed reacted gaseous mixture containing methanol vapor and unreacted gases, continuously introducing said hot compressed gaseous mixture into a distillation zone and contacting the same with a body of said carbonaceous material to be destructively distilled whereby to impart to the said material sufficient heat and pressure to effect the distillation thereof, said carbonaceous material being obtained from a source independent of the methanol forming synthesis.

4. In the process of concurrently carrying out the destructive distillation of material taken from the class consisting of normally solid and liquid carbonaceous materials which yield substantial amounts of volatile products upon distillation to form gaseous and liquid products, and the catalytic formation of methanol, the steps which comprise continuously introducing into a reaction zone a gaseous mixture containing a carbonic oxide and hydrogen, reacting said mixture in the presence of a hydrogenating catalyst at a pressure above 250 atmospheres and at a temperature of from 200-600° C., continuously withdrawing the hot compressed reacted gaseous mixture containing methanol vapors and unreacted gases, continuously introducing said hot compressed gaseous mixture into a distillation zone and contacting the same with a body of said carbonaceous material to be destructively distilled, thereby repressing the formation of products of lower molecular weight and enhancing the formation of products of higher molecular weight, said carbonaceous material being obtained from a source independent of the methanol forming synthesis.

5. The process described in claim 4 further characterized in that the gases and vapors are continuously withdrawn from the distillation zone, the vapors removed by condensation, and a portion of the condensate recycled through the distillation zone in the liquid state.

6. The process described in claim 4 in which gases and vapors are continuously withdrawn from the distillation zone, the vapors removed by condensation, and the gases continuously recycled to the reaction zone for further conversion.

7. In the process of concurrently carrying out the destructive distillation of coal to form coke and gaseous or liquid organic compounds, and the catalytic synthesis of methanol, the steps which comprise continuously introducing into a reaction zone a gaseous mixture containing a carbonic oxide and hydrogen, reacting said mixture at a pressure about 250 atmospheres and at a temperature of about 420-450° C. in the presence of a hydrogenating catalyst, continuously withdrawing from the reaction zone the hot compressed gaseous reacted mixture containing methanol and unreacted gases, continuously introducing said gaseous mixture into a distillation zone and contacting the same with a body of coal to be destructively distilled whereby to form coke, and vaporous and gaseous products, continuously withdrawing the vaporous and gaseous products from the distillation zone and separating the vapors by condensation.

8. In the process of carrying out the destructive distillation of a non-gaseous, carbonaceous material to produce liquid and gaseous organic products and simultaneously carrying out the formation of methanol and a mixture of hot gases and vapors by passing a mixture of carbon monoxide and hydrogen over a hydrogenating catalyst at a temperature of at least 300° C. and a pressure of at least 300 atmospheres, the steps which comprise passing said mixture into contact with said material so as to utilize the heat contained in said gases to effect the destructive distillation of said material to form said gaseous and liquid products under high pressure, thereby repressing the formation of compounds of lower molecular weight and enhancing the formation of compounds of higher molecular weight, said carbonaceous material being obtained from a source independent of the methanol forming reaction.

9. In the process of distilling material taken from the class consisting of normally solid and liquid carbonaceous materials which yield substantial amounts of volatile products upon distillation, the steps which comprise carrying out a high temperature exothermic hydrogenation reaction, withdrawing the hot reacted mixture and passing the said hot mixture in direct contact with a body of said carbonaceous material whereby to provide heat for said distillation, said carbonaceous material being obtained from a source independent of said reaction.

10. In the process of distilling material taken from the class consisting of normally solid and liquid carbonaceous materials which yield substantial amounts of volatile products upon distillation, the steps which comprise carrying out a high temperature exothermic hydrogenation reaction in the gaseous phase, withdrawing the hot gaseous reacted mixture, and passing the said hot mixture in direct contact with a body of said carbonaceous material whereby to provide heat for said distillation, said carbonaceous material being obtained from a source independent of said reaction.

11. In the process of destructively distilling material taken from the class consisting of normally solid and liquid carbonaceous materials which yield substantial amounts of volatile products upon distillation, the steps which comprise carrying out an exothermic hydrogenation reaction at a temperature in excess of that at which the carbonaceous material may be destructively distilled, withdrawing the hot reacted mixture, and passing the said hot mixture in direct contact with a body of liquid adapted to be destructively distilled, whereby to impart sufficient heat for said destructive distillation, said carbonaceous material being obtained from a source independent of said reaction.

12. In the process of destructively distilling material taken from the class consisting of normally solid and liquid carbonaceous materials which yield substantial amounts of volatile products upon distillation, the steps which comprise carrying out a gaseous exothermic hydrogenation reaction at a temperature in excess of that at which the carbonaceous material may be destructively distilled, withdrawing the hot gaseous reacted mixture, and passing the said hot mixture in direct contact with a body of liquid adapted to be destructively distilled, whereby to impart sufficient heat for said destructive distillation, said carbonaceous material being obtained from a source independent of said reaction.

13. In the process of effecting high pressure hydrogenation and distillation of material taken from the class consisting of normally solid and liquid carbonaceous materials which yield substantial amounts of volatile products upon distillation, the steps which comprise introducing into a reaction zone a gaseous mixture containing a carbonic oxide and hydrogen, effecting a reaction under elevated temperature and pressure sufficient to effect a reaction between the carbonic oxide and hydrogen, which reaction causes the evolution of heat, withdrawing from the reaction zone the hot compressed gaseous mixture containing gaseous reaction products and unreacted carbonic oxide and hydrogen, and introducing the said hot compressed gaseous mixture into a distillation zone wherein is contained a body of said carbonaceous material, said carbonaceous material being obtained from a source independent of said reaction.

14. In the process of effecting high pressure hydrogenation and distillation of material taken from the class consisting of normally solid and liquid carbonaceous materials which yield substantial amounts of volatile products upon distillation, the steps which comprise introducing into a reaction zone a gaseous mixture containing a carbonic oxide and hydrogen, effecting a reaction at a pressure above 250 atmospheres and at a temperature between 200–600° C. in the presence of a hydrogenating catalyst, withdrawing from the reaction zone the hot compressed gaseous mixture containing gaseous reaction products and unreacted carbonic oxide and hydrogen, and introducing the said hot compressed gaseous mixture into a distillation zone wherein is contained a body of said carbonaceous material, said carbonaceous material being obtained from a source independent of said reaction.

15. In the process of destructively distilling material taken from the class consisting of normally solid and liquid carbonaceous materials which are destructively distillable so as to yield a substantial amount of volatile products on destructive distillation thereof, the steps which comprise carrying out an exothermic high temperature hydrogenation reaction, withdrawing the hot reacted mixture, further heating the mixture to a temperature above that at which the said carbonaceous material will be destructively distilled, and passing the said heated mixture in direct contact with a body of said carbonaceous material.

16. The process of claim 15 in which the exothermic reaction is carried out under high pressure in the gaseous phase, and the gaseous mixture is passed in direct contact with the carbonaceous material without releasing the pressure.

GEORGES PATART.